US012477984B2

(12) United States Patent
Deichmann et al.

(10) Patent No.: US 12,477,984 B2
(45) Date of Patent: Nov. 25, 2025

(54) AGRICULTURAL SYSTEM AND METHOD FOR DETERMINING HEADER THROUGHPUT OF A HARVESTER

(71) Applicant: CNH Industrial America LLC, New Holland, PA (US)

(72) Inventors: Scott Deichmann, Phoenixville, PA (US); Stephen Todderud, Lancaster, PA (US); Tyler Nishnick, Hamburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 596 days.

(21) Appl. No.: 17/877,145

(22) Filed: Jul. 29, 2022

(65) Prior Publication Data
US 2024/0032467 A1   Feb. 1, 2024

(51) Int. Cl.
*A01D 41/127*    (2006.01)
*A01D 41/14*     (2006.01)
(Continued)

(52) U.S. Cl.
CPC ......... *A01D 41/127* (2013.01); *A01D 41/141* (2013.01); *A01D 61/004* (2013.01); *G01F 1/10* (2013.01)

(58) Field of Classification Search
CPC ................ A01D 41/127; A01D 41/141; A01D 41/1271; A01D 61/004; A01D 45/021; G06F 1/10
See application file for complete search history.

(56) References Cited

U.S. PATENT DOCUMENTS 4,487,002 A   12/1984   Kruse et al.
4,513,562 A   4/1985    Strubbe
(Continued)

FOREIGN PATENT DOCUMENTS

EP   0077667      4/1983
EP   3494771 B1   12/2020
(Continued)

OTHER PUBLICATIONS

International Search Report and Written Opinion for Application No. PCT/US2023/028911 dated Nov. 22, 2023 (12 pages).

*Primary Examiner* — Michael J Zanelli
(74) *Attorney, Agent, or Firm* — Dority & Manning, P.A.

(57) ABSTRACT

An agricultural system for determining a header throughput of a harvester includes a header having a frame and an auger assembly supported relative to the frame. The auger assembly includes an auger configured to direct a flow of harvested materials through the header, and an auger support assembly, the auger support assembly having an auger support member configured to support the auger relative to the frame, with the auger being rotatable relative to the auger support member. The agricultural system further includes a sensor associated with the auger assembly, where the sensor is configured to generate data associated with a load-related parameter of the auger support assembly. Additionally, the agricultural system includes a computing system communicatively coupled to the sensor and configured to receive the data generated by the sensor and to determine a header throughput based at least in part on the data.

20 Claims, 4 Drawing Sheets

(51) Int. Cl.
*A01D 61/00* (2006.01)
*G01F 1/10* (2006.01)

(56) References Cited

U.S. PATENT DOCUMENTS

| | | |
|---|---|---|
| 6,192,664 B1 | 2/2001 | Missotten et al. |
| 2003/0066277 A1* | 4/2003 | Behnke ................ A01D 41/127 |
| | | 56/10.2 R |
| 2020/0008350 A1 | 1/2020 | Borsdorf et al. |
| 2020/0068804 A1 | 3/2020 | Barther et al. |
| 2020/0100428 A1* | 4/2020 | Anderson .......... A01D 41/1271 |
| 2021/0235622 A1* | 8/2021 | Baumgarten ...... A01D 41/1278 |
| 2022/0132740 A1 | 5/2022 | Hunt |

FOREIGN PATENT DOCUMENTS

| | | | |
|---|---|---|---|
| EP | 3818808 A1 | 5/2021 | |
| EP | 3552474 B1 | 8/2021 | |
| WO | 2021/222592 A1 | 11/2021 | |
| WO | WO-2023175115 A1 * | 9/2023 | ........... A01D 41/142 |

* cited by examiner

AGRICULTURAL SYSTEM AND METHOD FOR DETERMINING HEADER THROUGHPUT OF A HARVESTER

FIELD OF THE INVENTION

The present disclosure relates generally to agricultural harvesters and, more particularly, to agricultural systems and methods for determining header throughput of an agricultural harvester.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing. The harvester also includes a crop processing system, which performs various processing operations (e.g., threshing, separating, cleaning, etc.) of the harvested crop received from the harvesting implement.

Typically, the settings of the crop processing system are controlled based on a yield estimate generated after the crop has been at least partially processed by the crop processing system. However, if there is a sudden increase of crop to be processed being received from the header, the crop processing system may not be able to adjust quickly enough to properly process the increased amount of crop, which may cause crop losses to occur. Additionally, if there is a sudden drop of crop to be processed being received from the header, the crop processing system may not be cleaning the crop as aggressively as it could, which generally lowers the cleaning efficiency of the harvester, or the processing speed may be lower than necessary, which means that the harvesting operation takes longer than necessary.

Accordingly, an agricultural system and method for determining header throughput of an agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for determining a throughput of a header of a harvester. The agricultural system includes a frame and an auger assembly supported relative to the frame. The auger assembly includes an auger configured to direct a flow of harvested materials through the header, and an auger support assembly. The auger support assembly has an auger support member configured to support the auger relative to the frame, with the auger being rotatable relative to the auger support member. The agricultural system further includes a sensor associated with the auger assembly, where the sensor is configured to generate data associated with a load-related parameter of the auger support assembly. Additionally, the agricultural system includes a computing system communicatively coupled to the sensor. The computing system is configured to receive the data generated by the sensor and to determine a header throughput based at least in part on the data.

In another aspect, the present subject matter is directed to an agricultural method for determining a throughput of a header of a harvester, where the header of the harvester has an auger assembly. The auger assembly includes an auger configured to direct crop through the header and an auger support assembly. The auger support assembly includes an auger support member supporting the auger relative to a frame of the header, with the auger being rotatable relative to the auger support member. The method includes operating the auger assembly such that a flow of harvested materials is directed through the header. The method further includes receiving, with a computing system, data generated by a sensor associated with the auger assembly, the data being associated with a load-related parameter of the auger support assembly. Additionally, the method includes determining, with the computing system, the header throughput based at least in part on the data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
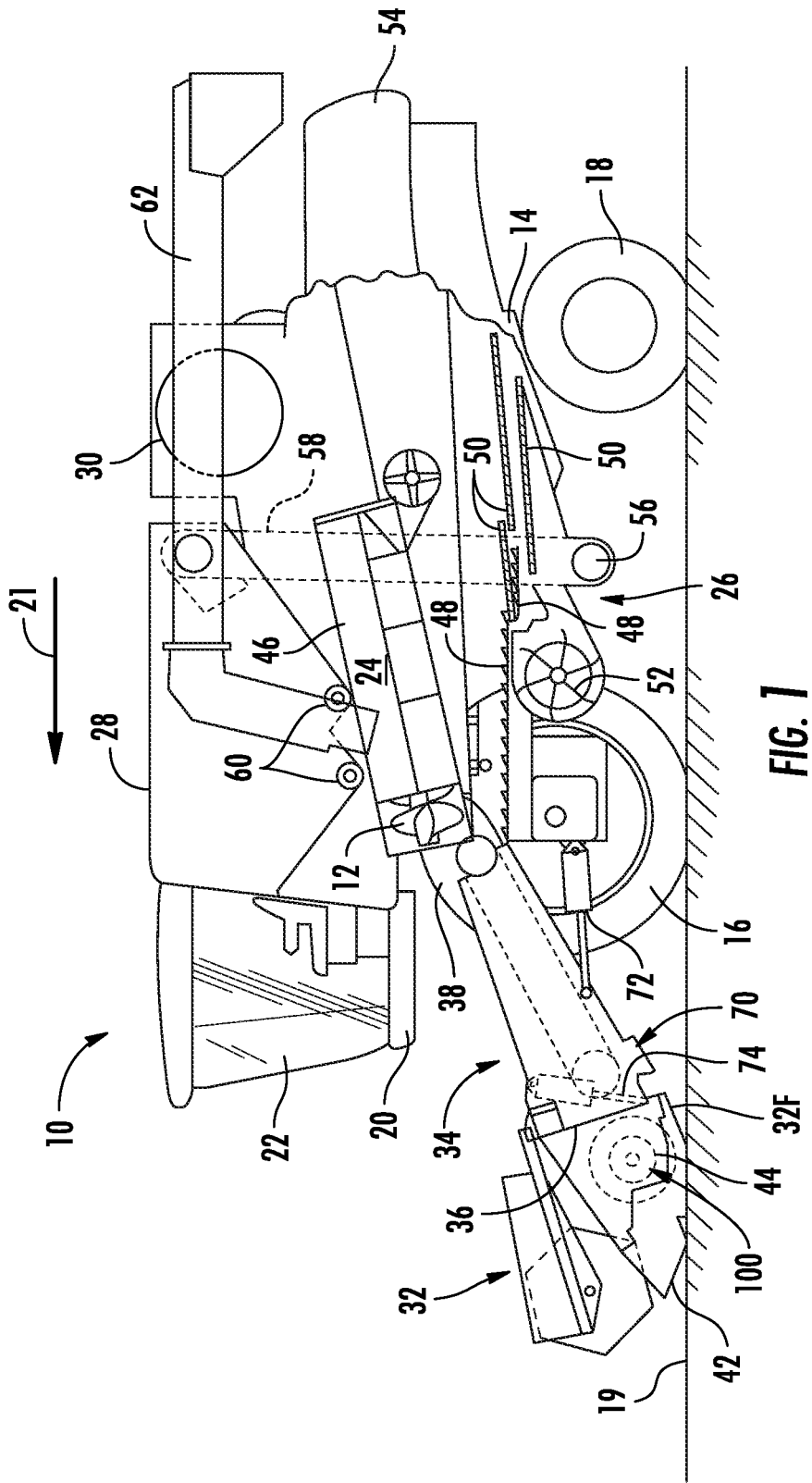
FIG. 1 illustrates a simplified, partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to agricultural systems and methods for determining header throughput of an agricultural harvester. Specifically, in several embodiments, the disclosed system includes a header of the agricultural harvester, the header having a frame, and an auger assembly supported relative to the frame. The auger assembly has an auger and an auger support assembly. The auger is supported relative to the frame of the header by an auger support member of the auger support assembly. The auger is rotatable relative to the auger support member such that the auger may rotate relative to the frame to the direct a flow of harvested materials through the header toward a feeder housing of the harvester. The auger support member may be fixed to the frame of the header or may instead be allowed to pivot relative to the frame about a pivot joint. The disclosed system may further include one or more sensors configured to generate data associated with a load-related parameter of the auger support assembly. For instance, the sensor may generate data indicative of a strain on the auger support member or the joint fixing the auger support member to the frame. Alternatively, or additionally, when the auger support member is allowed to rotate relative to the frame of the header, the data may be indicative of pivoting of the auger support member relative to the frame about the pivot joint. In instances where the auger support member is allowed to pivot relative to the frame of the header, the auger support assembly may additionally include a stop member fixed relative to the frame of the header and configured to prevent the auger from pivoting past a maximum angular position about the pivot joint, with the data being indicative of a position of the auger relative to the stop member.

The data received from the sensor(s) may be generally correlated to the header throughput (i.e., the amount of harvested materials flowing through the header to the feeder housing). Knowing the header throughput, the settings of the crop processing system may be adjusted pre-emptively to prevent crop losses and to improve the efficiency of the harvester.

Referring now to the drawings, FIG. 1 illustrates a simplified, partial sectional side view of one embodiment of a work vehicle, such as an agricultural harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement (indicated by arrow 21 in FIG. 1) relative to the ground surface 19. Additionally, an operator's platform 20 with an operator's cab 22, a threshing and separating assembly 24, a grain cleaning assembly 26 and a holding tank 28 may be supported by the frame 14. As is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as a support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

Figure 3:
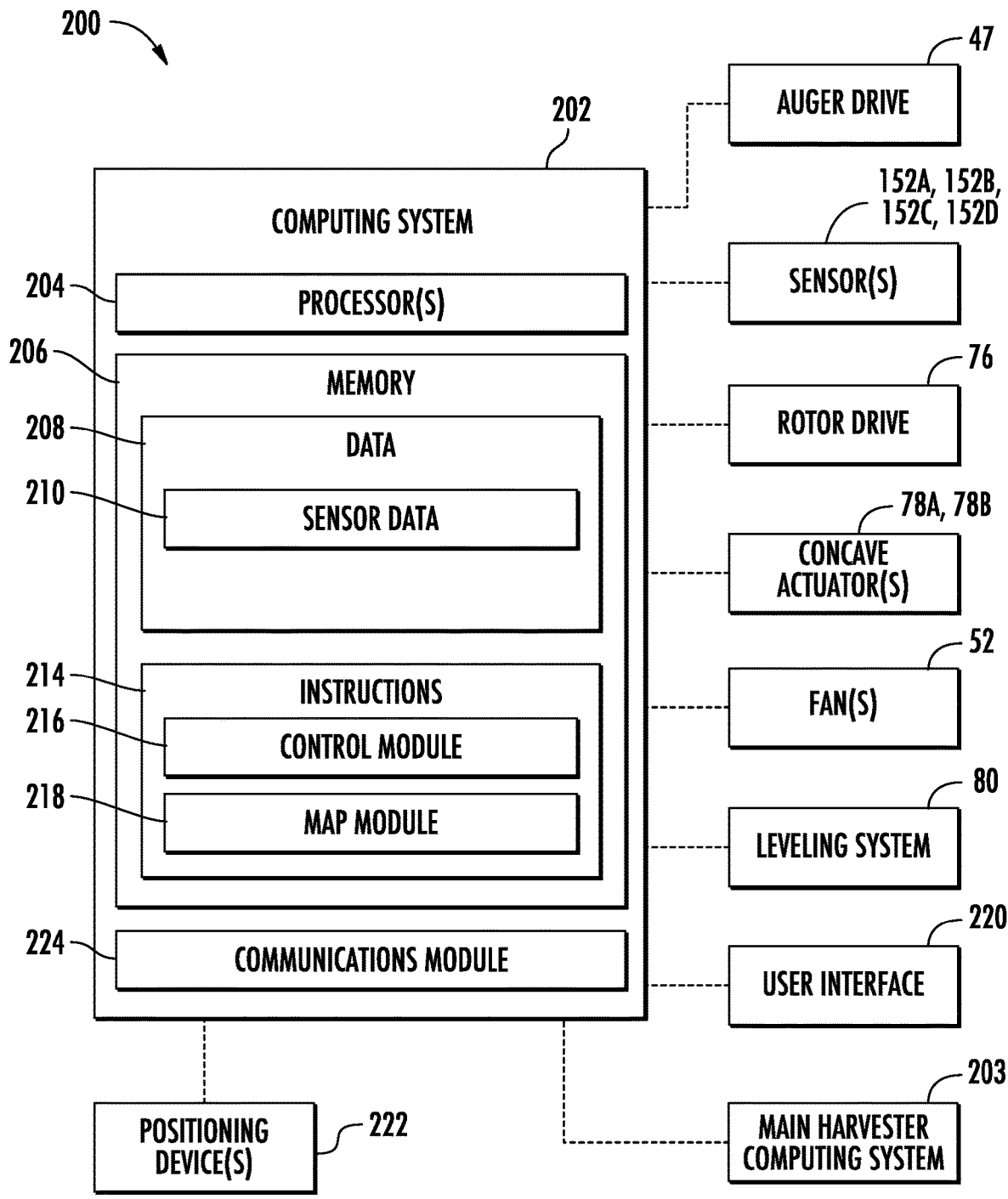
FIG. 3 illustrates a schematic view of a system for determining header throughput of an agricultural harvester in accordance with aspects of the present subject matter.

As the harvester 10 is propelled forwardly over a field with standing crop, the crop material is severed from the stubble by a sickle bar 42 at the front of the header 32 and delivered by a header auger 44 to the front end 36 of the feeder 34, which supplies the cut crop to the threshing and separating assembly 24. As is generally understood, the threshing and separating assembly 24 may include a cylindrical chamber or concave rotor cage 46 (hereinafter referred to as "concave 46") in which the rotor 12 is rotated by a rotor drive 76 (FIG. 3) to thresh and separate the crop received therein. That is, the crop is rubbed and beaten between the rotor 12 and the inner surfaces of the concave 46, whereby the grain, seed, or the like, is loosened and separated from the straw or MOG. In some embodiments, a position of the concave 46 about the rotor axis (e.g., a distance from the rotor axis) may be adjustable by one or more first concave actuators 78A (FIG. 3) and/or an angle of vanes (not shown) within the concave 46 may be adjustable by one or more second concave actuators 78B (FIG. 3).

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10. In some embodiments, a leveling system 80 (FIG. 3) may be provided for adjusting the lateral positioning of the cleaning assembly 48, 50. For instance, when the agricultural harvester 10 is on a hill such that one lateral side of the agricultural harvester 10 is positioned higher than its other lateral side, one or more actuators of the leveling system 80 may adjust the lateral positioning or angle of the pans 48 and/or the sieves 50 to counteract such sloping and keep the pans 48 and sieves 50 level.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a hydraulic system 70 which is configured to adjust a height of the header 32 relative to the ground surface 19 so as to maintain the desired cutting height between the header 32 and the ground surface 19. The hydraulic system 70 may include a height actuator 72 (e.g., a fluid-actuated cylinder) configured to adjust the height or vertical positioning of the header 32 relative to the ground. For example, in some embodiments, the height actuator 72 may be coupled between the feeder 34 and the frame 14 such that the height actuator 72 may pivot the feeder 34 to raise and lower the header 32 relative to the ground 19. In addition, the hydraulic system 70 may include a tilt actuator(s) 74 (e.g., a fluid-actuated cylinder) coupled between the header 32 and the feeder 34 to allow the header 32 to be tilted relative to the ground surface 19 or pivoted laterally or side-to-side relative to the feeder 34.

Additionally, in accordance with aspects of the present subject matter, as will be described in greater detail below, the harvester 10 may include an auger support assembly 100 for supporting the header auger 44 relative to a frame 32F of the header 32 and a sensor assembly including one or more sensors associated with the auger support assembly 100. In general, crop material being moved by the auger 44 applies a load on the auger support assembly 100. A load-related parameter of the auger support assembly 100 is detected by the sensor assembly and is indicative of the load on the auger support assembly 100, and thus, the header throughput of the header 32. Using the header throughput, adjustment(s) may be made to the operation of the harvester 10 to reduce crop losses and improve efficiency of the crop processing operations.

Figure 2:
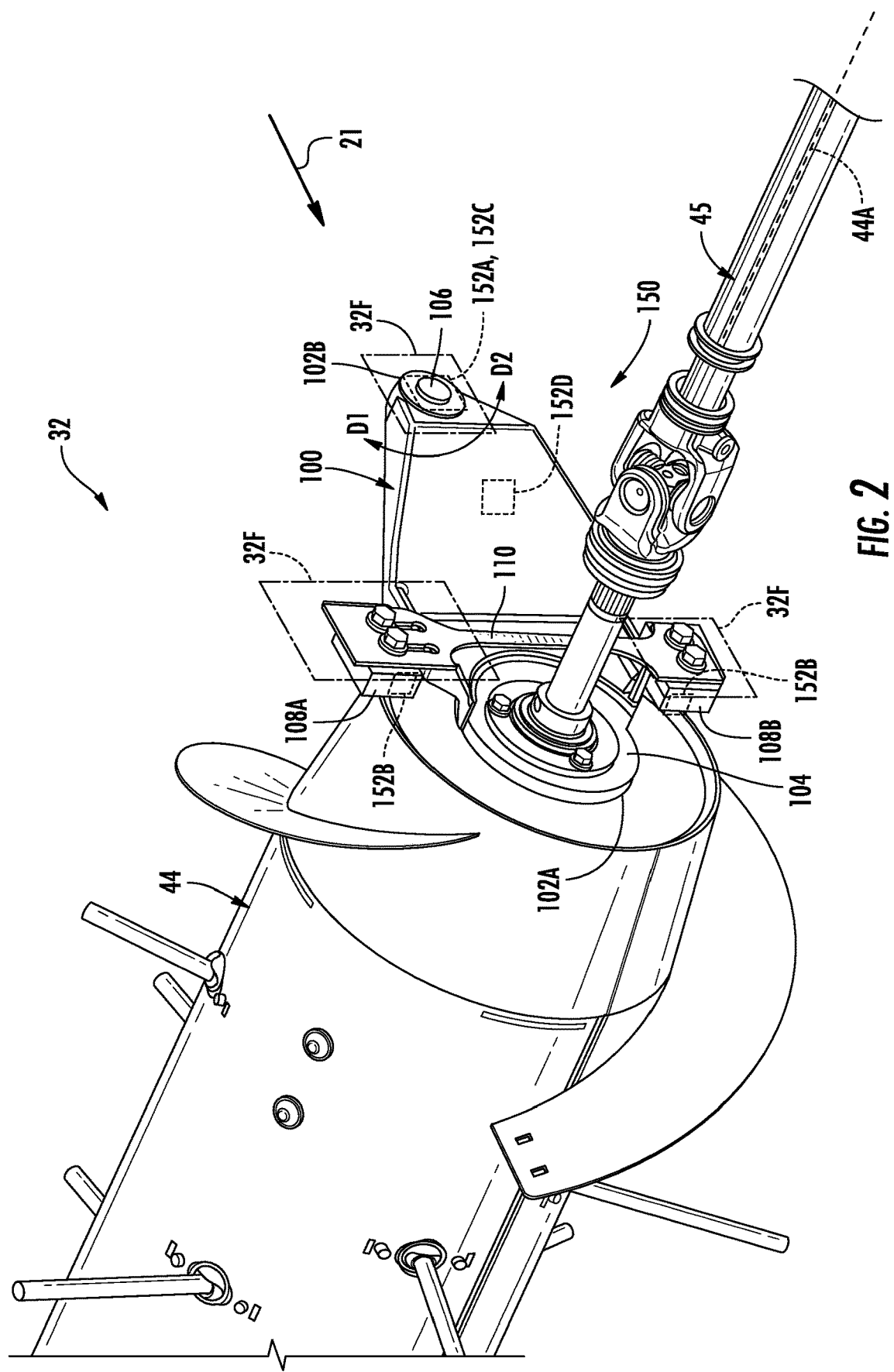
FIG. 2 illustrates a detail view of various components of a header of an agricultural harvester in accordance with aspects of the present subject matter, particularly illustrating an auger support assembly and a sensing assembly associated with the auger support assembly for determining a header throughput of the agricultural harvester.

Referring now to FIG. 2, a detail view of various components of the header 32 of the agricultural harvester 10 is illustrated in accordance with aspects of the present subject matter, particularly illustrating the auger support assembly 100 and a sensing assembly 150 associated with the auger support assembly 100 for determining a header throughput of the agricultural harvester 10. As shown in FIG. 2, the auger support assembly 100 includes an auger support member 102 configured to support the auger 44 relative to the frame 32F (shown only schematically) of the header 32. More particularly, the auger support member 102 extends between a first end 102A and a second end 102B. The auger 44 is coupled to the first end 102A of the auger support member 102 for rotation relative thereto. For instance, the auger support assembly 100 may further include a rotational coupling device 104 for coupling the auger 44 to the first end 102A of the auger support member 102. The rotational coupling device 104 may be between the first end 102A of the auger support member 102 and a central axis 44A of the auger 44, where the rotational coupling device 104 allows the auger 44 to rotate about its central axis 44A relative to the auger support member 102 and the frame 32F. The rotational coupling device 104 may be a rotary bearing. However, it should be appreciated that the rotational coupling device 104 may be any other suitable rotational coupling device(s) and/or that the auger 44 may be rotatably coupled to the first end 102A of the auger support member 102 in any other suitable manner such that the auger 44 is rotatable about its central axis 44A relative to the auger support member 102 and the frame 32F. Generally, the auger 44 is rotatably coupled to an auger drive shaft 45 which is driven by an auger drive 47 (FIG. 3) to rotate the auger 44 about the auger central axis 44A.

The second end 102B of the auger support member 102 is coupled to the frame 32F at a joint 106 such that the auger 44 is supported relative to the frame 32F. For instance, in one embodiment, the joint 106 is a pivot joint pivotably coupling the second end 102B of the auger support member 102 to the frame 32F such that the auger support member 102 and the attached auger 44 may pivot relative to the frame 32F about the joint 106. However, it should be appreciated that, in other embodiments, the second end 102B of the auger support member 102 may be fixed to the frame 32F by the joint 106 such that the auger support member 102 does not freely pivot relative to the frame 32F.

In embodiments where the auger support member 102 is pivotably coupled to the frame 32F about the joint 106, the auger support assembly 100 may further include one or more stop members configured to limit the pivoting or rotation of the auger 44 about the joint 106. For instance, a first stop member 108A may be supported relative to the frame 32F and be associated with a maximum upper rotational limit of the auger 44 and the auger support member 102 about the joint 106. More particularly, the auger 44 and auger support member 102 may pivot about the joint 106 in a first direction D1 until the auger 44 and/or the auger support member 102 abuts against the first stop member 108A. Similarly, a second stop member 108B may be supported relative to the frame 32F and be associated with a maximum lower rotational limit of the auger 44 and the auger support member 102 about the joint 106. More particularly, the auger 44 and the auger support member 102 may pivot about the joint 106 in a second direction D2, opposite the first direction D1, until the auger 44 and/or the auger support member 102 abuts against the second stop member 108A. The first and second stop members 108A, 108B may be coupled to a stop positioning member 110, which may, in turn, be coupled to the frame 32F. The position of one or both of the stop members 108A, 108B relative to the stop positioning member 110 may be adjustable to adjust the maximum upper and/or lower rotational limits. For instance, as shown, the stop positioning member 110 may have slots through which the stop member(s) 108A, 108B is coupled to the stop positioning member 110 (e.g., by bolts, screws, rivets, and/or the like), which allows the stop member(s) 108A, 108B to be selectively positionable at any location along the slots.

A sensing assembly 150 may be provided in association with the auger assembly. Particularly, the sensing assembly 150 may include one or more sensors configured to generate data associated with a load-related parameter of the auger support assembly 100. For instance, in some embodiments in which the auger support member 102 is pivotable about the joint 106, the load-related parameter may be an angular position of the auger support member 102 about the joint 106. In such embodiments, the sensing assembly 150 may include a rotational position sensor 152A (e.g., a rotary potentiometer, rotary encoder, and/or the like) at the joint 106 configured to generate data indicative of an angular position of the auger support member 102 about the joint 106. In general, the greater the angular movement (e.g., in the first pivot direction D1) of the auger support member 102 from a neutral position, the greater the header throughput. Similarly, in some embodiments, the sensing assembly 150 may include one or more sensors 152B configured to generate data indicative of a position of the auger 44 and/or the auger support member 102 relative to the stop member(s) 108A, 108B. For instance, the sensor(s) 152B may be Hall-effect sensors, radar sensors, linear potentiometers, and/or any other suitable sensors or combination of sensors. Generally, the closer the auger 44 and the auger support member 102 are to the first stop member 108A, the greater the header throughput.

Additionally, or alternatively, the load-related parameter may include a force on the joint 106 between the auger support member 102 and the frame 32F. For instance, the sensing assembly 150 may include a load sensor 152C configured to generate data indicative of a force applied to the joint 106, such as a torque about the joint 106, when the auger support member 102 is pivotable about the joint 106, or a load (e.g., strain) applied to the joint 106. In such instance, the sensor may be a torque sensor (e.g., a torque transducer), a strain gauge, and/or the like. Generally, the larger the force applied to the joint 106, the greater the header throughput. In some embodiments, the load-related parameter may include a strain on the auger support member 102 itself. For instance, the sensing assembly 150 may include a strain sensor 152D (e.g., a strain gauge) configured to generate data indicative of the strain on the auger support member 102, such as at a location between the first and second ends 102A, 102B (e.g., between the rotational coupling device 104 and the joint 106). Generally, the greater the strain on the auger support member 102, the higher the header throughput.

It should be appreciated that, while only one end of the auger 44 is shown, the other end of the auger 44 is configured to be supported by auger support assembly 100 in the same manner and may be associated with respective ones of the sensor(s) 152A, 152B, 152C, 152D described above.

Referring now to FIG. 3, a schematic view of one embodiment of a control system 200 for determining header throughput of an agricultural harvester is illustrated in accordance with aspects of the present subject matter. In general, the control system 200 will be described herein with reference to the harvester 10 described with reference to FIG. 1, and the auger support assembly 100 and sensing assembly 150 described with reference to FIG. 2. However, it should be appreciated that the disclosed control system 200 may be used with any suitable agricultural work vehicle having any other suitable vehicle configuration, an auger support assembly having any other suitable configuration, and/or with a sensing assembly having any other suitable configuration.

As shown, the control system 200 may include any combination of components of the harvester 10 and sensing assembly 150 described above with reference to FIGS. 1-2. For instance, the system 200 may include: the auger drive 47 for rotationally driving the auger 44; the sensor(s) 152A, 152B, 152C, 152D for generating data indicative of a load-related parameter of the auger support assembly 100; the rotor drive 76 for controlling a rotational speed of rotor 12; the concave actuator(s) 78A, 78B for controlling the position of the concave 46 and/or angle of vanes of the concave 46; the fan(s) 52 for providing the air flow through the sieves 50 that removes chaff and other impurities from the crop material; and the leveling system 80 for adjusting a position of the pans 48 and the sieves 50.

Additionally, as shown in FIG. 3, the control system 200 may include a computing system 202 installed on and/or otherwise provided in operative association with the harvester 10. In general, the computing system 202 may correspond to any suitable processor-based device(s), such as a computing device or any combination of computing devices. Thus, in several embodiments, the computing system 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the computing system 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the control algorithms and/or methods described herein.

In one embodiment, the memory 206 of the computing system 202 may include one or more databases for storing information associated with the operation of the harvester 10, including data 208 associated with determining the header throughput of the header 32 of the harvester 10. For instance, as shown in FIG. 3, the memory 206 may include a sensor database 210 for storing data associated with the load-related parameter(s) (e.g., angular position about the joint 106, position relative to the stop member(s) 108A, 108B, force on the joint 106, and/or strain on the auger support member 102) provided by the sensor(s) 152A, 152B, 152C, 152D. Specifically, the computing system 202 may be communicatively coupled to each of the sensor(s) 152A, 152B, 152C, 152D to allow the data indicative of the load-related parameter(s) generated by the sensor(s) 152A, 152B, 152C, 152D to be transmitted to the computing system 202. As such the computing system 202 may be configured to continuously monitor and store the data indicative of the load-related parameter(s), which in turn is indicative of the header throughput.

Referring still to FIG. 3, in several embodiments, the memory 206 of the computing system 202 may store instructions 214 that, when executed by the processor(s) 204, configure the computing system 202 to execute a control module 216. For instance, the control module 216 may be configured to determine the header throughput based at least in part on the sensor data 210. For instance, as indicated above, the sensor data 210 may be generally correlatable to the header throughput. For example, increased header throughput may be correlated to one or more of the following: (1) the auger support member 102 pivoting further from a neutral angular position about the joint 106; (2) the auger support member 102 being closer to the stop member(s) 108A, 108B (e.g., the stop member 108A); (3) the force on the joint 106 increasing; and/or (4) the strain on the auger support member 102 increasing. However, the sensor data 210 may be more directly correlatable to the header throughput. For instance, one or more relationships (e.g., algorithm(s), lookup table(s), etc.) may be defined and stored within the memory 206 of the computing system 202 that correlate the load-related parameter(s), individually or as a combination, to the header throughput.

The control module 216 may be further configured to control one or more components of the harvester 10. For instance, the control module 216 may generally be configured to control an operation of the auger drive 47 to drive the auger 44 to direct crop material through the header 32 to the front end 36 of the feeder 34. Additionally, the control module 216 may be configured to control an operation of the crop processing system to reduce crop losses and/or improve efficiency of the harvester 10 based at least in part on the header throughput. For example, the control module 216 may control the rotor drive 76 to adjust a rotational speed of the rotor 12, the concave actuator(s) 78A, 78B to adjust the concave 46 (e.g., a position of the concave 46 about the rotational axis of the rotor 12 and/or an angle of vanes of the concave 46), and/or the fan(s) 52 to adjust the air flow in response to the header throughput. For instance, in response to a change in the header throughput, the rotor drive 76 may be controlled to increase or decrease the rotational speed of the rotor 12; the first concave actuator(s) 78A may be controlled to move the concave 46 closer to the rotor 12 to increase an aggressiveness of the threshing and separating assembly; the second concave actuator(s) 78B may be controlled to change the degree of opening of the vanes of the concave 46 to create additional passes within the threshing and separating assembly; and/or the fan(s) 52 may be controlled to increase or decrease the air flow across the sieves 50.

It should be appreciated that the automated control of the different parts of the harvester 10 in response to the distribution of the crop loss may additionally take into account further operating factors of the harvester 10, such as crop type, moisture content, and/or the like.

Alternatively, or additionally, in some embodiments, the control module 216 may be configured to control an operation of a user interface 220 associated with the agricultural harvester 10. In general, the user interface 220 may correspond to any suitable input device(s) configured to allow the operator to provide operator inputs to the computing system 202, such as a touch screen display, a keyboard, joystick, buttons, knobs, switches, and/or combinations thereof located within the cab 22 of the harvester 10. The operator may provide various inputs into the system 202 via the user interface 220. In one embodiment, suitable operator inputs may include, but are not limited to, a target rotor speed, a target concave position and/or vane angle, a lateral leveling of the cleaning assembly, and/or any other parameter associated with the harvester 10. In addition, the user interface 220 may also be configured to provide feedback (e.g., feedback associated with the location and/or header throughput) to the operator. As such, the user interface 220 may include one or more output devices (not shown), such as display screens, speakers, warning lights, and/or the like, which are configured to provide feedback from the computing system 202 to the operator. For example, the computing system 202 may control an operation of the user interface 220 to indicate to the operator of the harvester 10 the header throughput and/or suggested actions based on the header throughput to reduce crop loss and/or improve efficiency.

The instructions 214, when executed by the processor(s) 204, may further configure the computing system 202 to execute a map module 218. In general, the map module 218 may be configured to correlate the header throughput, or a parameter related to header throughput (e.g., yield, residue coverage, and/or the like), to different locations within the field. For instance, the computing system 202 may also be communicatively coupled with one or more positioning device(s) 222, such as a Global Positioning System (GPS) or another similar positioning device, configured to transmit a location corresponding to a position of the harvester 10 (e.g., of the header 32) within the field when the sensor data 210 is generated by the sensor(s) 152A, 152B, 152C, 152D. The map module 218 may generate a header throughput map, a yield map, a residue coverage map, and/or the like, correlating the header throughput (or related parameter) to each position of the harvester 10 associated with each data point of the sensor data. The generated map(s) may be used to control subsequent agricultural operations within the field (e.g., tillage, planting, and/or the like).

It should be appreciated that the computing system 202 may also include various other suitable components, such as a communications circuit or module 224, a network interface, one or more input/output channels, a data/control bus and/or the like, to allow the computing system 202 to be communicatively coupled with any of the various other system components described herein.

Additionally, it should be appreciated that, in some embodiments, the computing system 202 is a header computing system configured to control operation of the header 32. In such embodiments, the header computing system 202 may be communicatively coupled to a main computing system 203 of the harvester 10 configured to control the operation of the crop processing system, downstream of the header 32, such as the operation of the rotor drive 76, the concave actuator(s) 78A, 78B, the fan(s) 52, and the leveling system 80, and, optionally, the user interface 220. The header computing system 202 and the main computing system 203 may be communicatively coupled in any suitable way. The header computing system 202 may be configured to receive the sensor data 210 from the sensor(s) 152A, 152B, 152C, 152D and determine the header throughput. In some embodiments, the header computing system 202 may then communicate the header throughput to the main computing system 203, where the main computing system 203 may subsequently control the operation of the crop processing system and/or user interface 220 based at least in part on the header throughput as suggested above with reference to the control module 216. Alternatively, or additionally, the header computing system 202 may control the operation of the crop processing system and/or user interface 220 via communication with the main computing system 203. It should be appreciated that by using the header computing system 202, the data processing load on the main computing system 203 may be reduced. It should additionally be appreciated that, due to the distance between the header 32 and the main computing system 203, it is easier to couple (e.g., with wires or wirelessly) the sensor(s) 152A, 152B, 152C, 152D to the header computing system 202 and to couple (e.g., with wires or wirelessly) the computing systems 202, 203 than to couple (e.g., with wires or wirelessly) the sensor(s) 152A, 152B, 152C, 152D directly to the main computing system 203.

Figure 4:
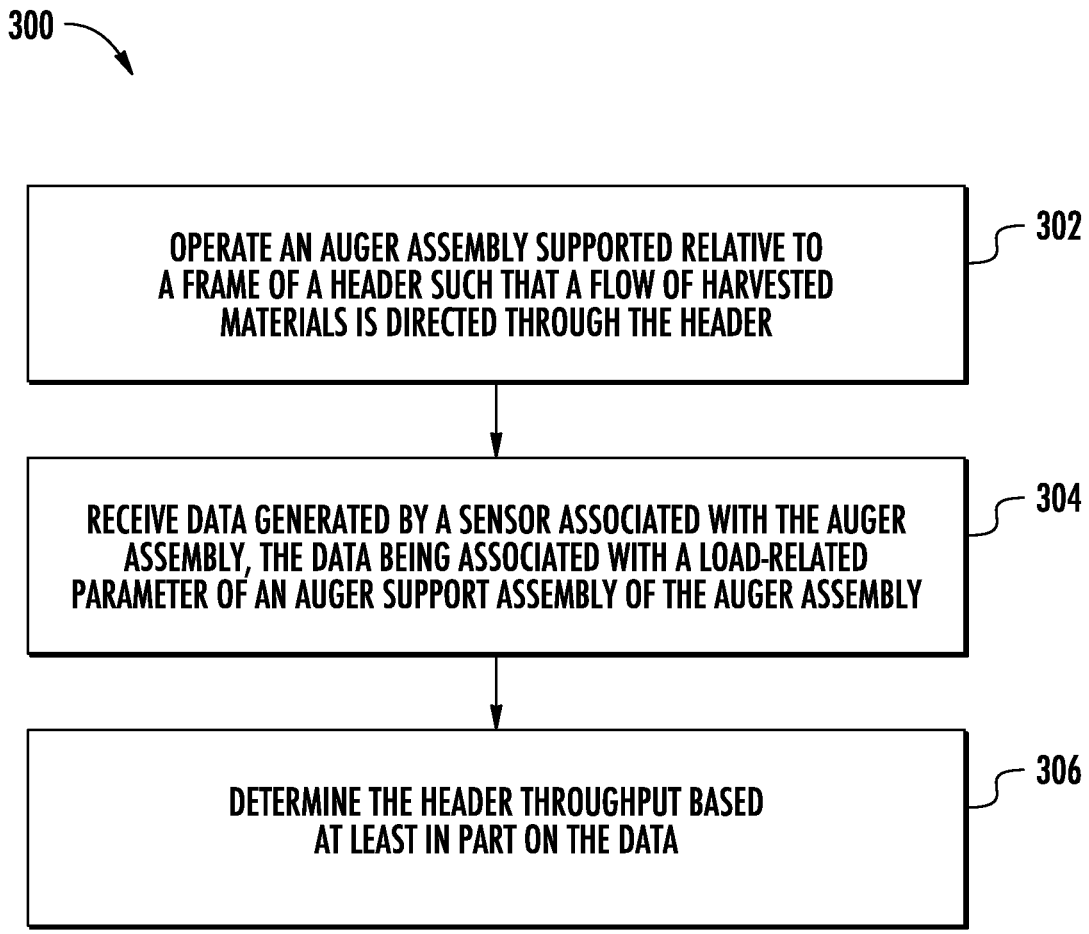
FIG. 4 illustrates a flow diagram of one embodiment of a method for determining header throughput of an agricultural harvester in accordance with aspects of the present subject matter.

Referring now to FIG. 4, a flow diagram of one embodiment of a method 300 for determining header throughput of an agricultural harvester (e.g., harvester 10) is illustrated in accordance with aspects of the present subject matter. For purposes of discussion, the method 300 will generally be described herein with reference to the harvester 10 described with reference to FIG. 1, the auger support assembly 100 and the sensing assembly 150 described with reference to FIG. 2, and the computing system 202 described with reference to FIG. 3. However, it should be appreciated that the disclosed method 300 may be used with any suitable agricultural work vehicle having any other suitable vehicle configuration, with an auger support assembly having any other suitable configuration, with a sensing assembly having any other suitable configuration, and/or with a computing system having any other suitable system configuration. Additionally, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302) the method 300 includes operating an auger assembly supported relative to a frame of a header such that a flow of harvested materials is directed through the header. For instance, as discussed above, the computing system 202 may be configured to control the operation of the auger drive 47 of the auger assembly to drive the auger 44 to direct the crop material through the header 32 towards a housing of the feeder 34.

Further, at (304), the method 300 includes receiving data generated by a sensor associated with the auger assembly, the data being associated with a load-related parameter of an auger support assembly of the auger assembly. For example, as described above, the computing system 202 may receive data generated by the sensor(s) 152A, 152B, 152C, 152D associated with the auger assembly, the data being associated with the load-related parameter(s) of the auger support assembly 100.

Additionally, at (306), the method 300 includes determining the header throughput based at least in part on the data. For instance, as described above, the computing system 202 may be configured to determine the header throughput based at least in part on the data generated by the sensor(s) 152A, 152B, 152C, 152D.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system for determining the throughput of a header configured for use with a harvester, the agricultural system comprising:
    a frame of the header;
    an auger assembly supported relative to the frame, the auger assembly comprising:
        an auger configured to direct a flow of harvested materials through the header; and
        an auger support assembly, the auger support assembly including an auger support member configured to support the auger relative to the frame, the auger being rotatable relative to the auger support member;
    a sensor associated with the auger assembly, the sensor being configured to generate data associated with a load-related parameter of the auger support assembly, the load-related parameter indicating change in load applied via the auger on the auger support assembly; and
    a computing system communicatively coupled to the sensor, the computing system being configured to receive the data generated by the sensor and to determine a header throughput based at least in part on the data.

2. The agricultural system of claim 1, wherein the load-related parameter comprises a strain on the auger support member applied via the auger, the sensor comprising a strain gauge coupled to the auger support member.

3. The agricultural system of claim 2, wherein the auger support member is fixed relative to the frame.

4. The agricultural system of claim 1, wherein the auger support member is pivotably coupled to the frame about a pivot joint such that the auger support member is pivotable relative to the frame.

5. The agricultural system of claim 4, wherein the load-related parameter comprises at least one of an angular position of the auger support member about the pivot joint or a force on the pivot joint.

6. The agricultural system of claim 5, wherein the sensor is coupled between the auger support member and the pivot joint.

7. The agricultural system of claim 4, wherein the auger support assembly further comprises a stop member fixed relative to the frame of the header, the stop member defining a maximum angular position of the auger about the pivot joint in a first pivot direction,
    wherein the load-related parameter comprises a position of at least one of the auger or the auger support member relative to the stop member.

8. The agricultural system of claim 1, wherein the computing system is further configured to adjust an operation of the harvester based at least in part on the header throughput.

9. The agricultural system of claim 1, wherein the computing system is a header computing system configured to control an operation of the header, the header computing system being in communication with a main computing system of the harvester.

10. An agricultural method for determining the throughput of a header configured for use with a harvester, the header including an auger assembly comprising an auger configured to direct crop through the header, the auger assembly further comprising an auger support assembly, the auger support assembly including an auger support member supporting the auger relative to a frame of the header, the auger being rotatable relative to the auger support member, the method comprising:

operating the auger assembly such that a flow of harvested materials is directed through the header;

receiving, with a computing system, data that is generated by a sensor associated with the auger assembly, the data being associated with a load-related parameter of the auger support assembly, the load-related parameter indicating change in load applied via the auger on the auger support assembly; and determining, with the computing system, a header throughput based at least in part on the data.

11. The agricultural method of claim 10, further comprising adjusting an operation of the harvester based at least in part on the header throughput.

12. The agricultural method of claim 10, further comprising controlling an operation of a user interface to indicate the header throughput.

13. The agricultural method of claim 10, further comprising generating a yield map based at least in part on the header throughput.

14. The agricultural method of claim 10, wherein the load-related parameter comprises a strain on the auger support member applied via the auger, the sensor comprising a strain gauge coupled to the auger support member.

15. The agricultural method of claim 14, wherein the auger support member is fixed relative to the frame of the header.

16. The agricultural method of claim 10, wherein the auger support member is pivotably coupled to the frame about a pivot joint such that the auger support member is pivotable relative to the frame.

17. The agricultural method of claim 16, wherein the load-related parameter comprises at least one of an angular position of the auger support member about the pivot joint or a force on the pivot joint.

18. The agricultural method of claim 17, wherein the sensor is coupled between the auger support member and the pivot joint.

19. The agricultural method of claim 16, wherein the auger support assembly further comprises a stop member fixed relative to the frame of the header, the stop member defining a maximum angular position of the auger about the pivot joint in a first pivot direction, wherein the load-related parameter comprises a position of at least one of the auger or the auger support member relative to the stop member.

20. The agricultural method of claim 10, wherein the computing system is a header computing system configured to control operation of the header, the header computing system being further configured to communicate the header throughput to a main computing system of the harvester.

* * * * *